April 8, 1952     G. E. BJÖRKLUND     2,591,772
LOCKING DEVICE FOR CONTRAANGLE HANDPIECES
Filed March 15, 1947
FIG. 1
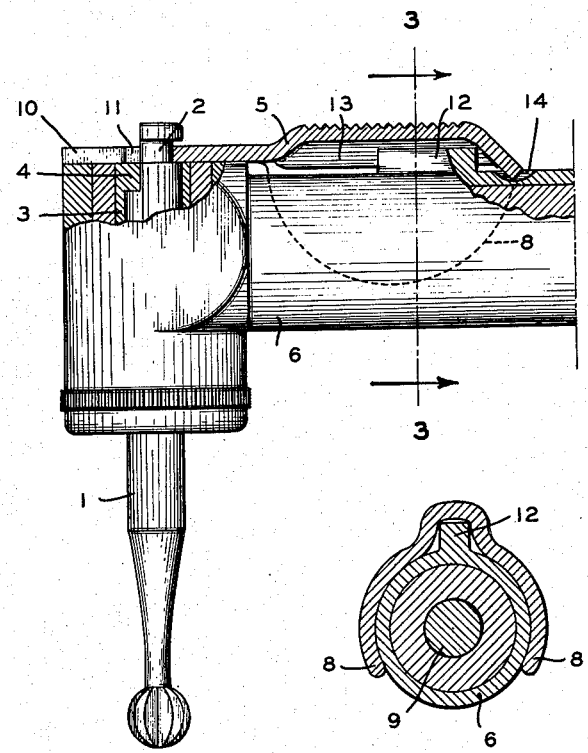
FIG. 3
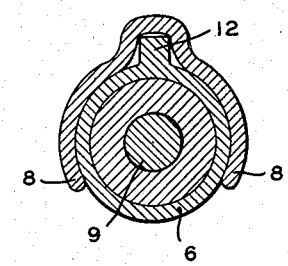
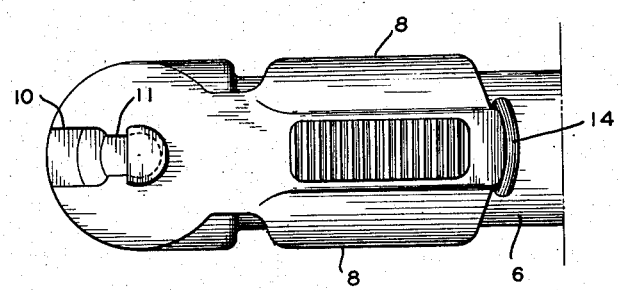
FIG. 2
*INVENTOR.*
GUSTAF ERIK BJORKLUND
BY
ATTORNEY Patented Apr. 8, 1952

2,591,772

UNITED STATES PATENT OFFICE 2,591,772

LOCKING DEVICE FOR CONTRAANGLE HANDPIECES

Gustaf Erik Björklund, Stockholm, Sweden

Application March 15, 1947, Serial No. 734,906
In Sweden March 20, 1946

4 Claims. (Cl. 32—27)

The present invention refers to contraangle handpieces for dental drills in which the driving shaft forms, in the main, right angles with the rotation axis of the drill. The drill is usually secured in a spindle sleeve to which the rotating motion of the driving shaft is transmitted by means of a bevel gear or similar arrangement. The gear together with bearing arrangements for the spindle sleeve and the driving shaft are built in a gear casing which is attached to the handle of the handpiece and is claimed in my copending application, Serial No. 734,905, filed March 15, 1947, now matured into U. S. Patent No. 2,568,314, granted September 18, 1951. The gear casing thus consists of a part connected with the handle through which part the driving shaft is carried and a part perpendicular thereto in which the spindle sleeve is journalled.

The spindle sleeve is provided with a central bore in which the drill is inserted and locked at the part lying farthest away from its point. The drill is there provided with an annular slot in which a locking member is arranged to enter. In known contraangle handpieces this locking member usually consists of a revolving arm journalled on a pivot or the like in a recess in the gear casing. Especially when the gear casing is made of a material difficult to work on as stainless steel, this locking arrangement has not proved to be suitable. There are also difficulties to bring about a tight construction that prevents grinding dust and the like from entering gear and bearing arrangements. The present invention refers to a locking device that in these respects is considerably more advantageous at the same time making an easier and more effective cleaning of the different parts of the handpiece possible. According to the invention the locking device consists of a slide arranged on the outside of the gear casing and being displaceable parallel to an axis perpendicular to the centre axis of the spindle sleeve or revolving about the first mentioned axis and being arranged to enter the annular slot of the drill. Preferably the slide is provided with an elastic part which is arranged to embrace the portion of the gear casing through which the shaft driving the spindle sleeve is carried.

The invention will be further described in the following portion of this specification with reference to the annexed drawing which illustrates one form of execution of the invention. In the drawing, Fig. 1 shows a contraangle handpiece with a locking device according to the invention seen from the side and partly in section.

Fig. 2 shows the handpiece seen from above and

Fig. 3 is a cross-section of the handpiece along the line III—III in Fig. 1.

In the drawing 1 marks a drill with an annular slot 2 inserted in the contraangle handpiece. The spindle sleeve 3 is provided with a projection 4 extending into the bore of the sleeve and fitting in a recess in the side of the drill thus preventing the latter from turning in relation to the spindle sleeve. A slide 5 is arranged on the outside of the gear casing 6 and is attached to this by means of two elastic flaps 8 which embrace the cylindrical portion of the gear casing which is perpendicular to the drill and through which the driving shaft 9 is carried. The slide extends forwardly over the portion of the gear casing in which the spindle sleeve is journalled and rests against the upper plane surface of said portion. The slide is there provided with an opening or notch with a wider portion 10 of some larger width than the diameter of the drill and a narrower portion 11 of some larger width than the diameter of the drill at the bottom of the annular slot.

The slide can be displaced on the cylindrical portion of the gear casing and is thereby guided by a projection 12 arranged on this portion and sliding in a groove 13 in the slide, as this is displaced.

In the position shown in the drawing the drill is in the narrower portion 11 of the notch of the slide, so that the edges of the notch extend into the annular slot, by means of which the drill is prevented from displacing itself axially in the bore of the spindle sleeve. The drill is thus locked in its proper position. If on the other hand the slide is displaced in such a way that the drill will be in the wider portion 10 of the notch in the slide, the drill can be pulled out of the spindle sleeve without pitch. When the slide is in the position in which the drill is locked, the rear tongue-shaped portion of the slide enters a recess 14 in the gear casing by means of which the slide is prevented from displacing itself from its position.

As the slide rests upon the upper plane surface of the gear casing, a good tightening of the gear casing is obtained, so that grinding dust or boring chips are prevented from entering the same. On account of the resiliency of the flaps, the slide may be easily removed so that the different parts of the handpiece will be easily accessible for cleaning.

The construction of the locking device described and shown in the drawing is only to be regarded as an example of execution. Within the limits of the claims this can be varied in different ways.

It is also obvious that the locking device according to the invention can be used in connection with other dental tools than drills for instance grinding tools or vibrators or the like.

What I claim is:

1. In a contraangle handpiece for dental tools, a combination, with a casing member and a spindle sleeve rotatably mounted in the casing member for holding an annularly grooved rotary tool, of a slide member provided with a portion embracing a part of said casing member and having elastic flaps engaging said casing member for retaining said slide member thereon, said slide member and said casing member having co-acting groove and projection portions for sliding engagement and said slide member being mounted to move toward and away from said spindle sleeve along an axis normal to the axis of said spindle sleeve and having a portion formed to enter the groove in the tool to retain the tool in said spindle sleeve.

2. A device as set forth in claim 1, in which said slide member is grooved and said casing member is provided with the co-acting projection.

3. A dental tool comprising a casing having a rotatable hollow spindle extending therethrough for receiving an implement shaft having a transverse groove adjacent one end, a portion of said casing extending substantially at right angle to the axis of said spindle, said portion of said casing having a transverse dimension of substantially constant breadth, a slide mounted on said portion for movement toward and away from said axis, said slide having casing embracing flaps for slidably embracing said portion of said casing, said flaps comprising resilient structure whereby said flaps serve to hold said slide in adjusted position and serving as the sole means for connecting said slide to said casing, said slide being provided with an opening for surrounding said shaft so that said slide retains said shaft in operative position, said slide being movable from a position for retaining said shaft in operative position to a position permitting said shaft to be removed.

4. The invention according to claim 3 in which said extending portion of said casing is cylindrical and said flaps embrace substantially more than half of said cylindrical portion.

GUSTAF ERIK BJÖRKLUND.

REFERENCES CITED

The following references are of record in the file of this patent:

UNITED STATES PATENTS

| Number | Name | Date |
|---|---|---|
| 467,799 | Genese | Jan. 26, 1892 |
| 1,678,097 | Andresen | July 24, 1928 |
| 2,180,499 | Beardsley | Nov. 21, 1939 |
| 2,231,969 | Tifft | Feb. 18, 1941 |
| 2,485,766 | Parcher | Oct. 25, 1949 |

FOREIGN PATENTS

| Number | Country | Date |
|---|---|---|
| 372,713 | Great Britain | May 12, 1932 |
| 390,503 | Germany | Feb. 20, 1924 |